US006408396B1

(12) United States Patent
Forbes

(10) Patent No.: US 6,408,396 B1
(45) Date of Patent: Jun. 18, 2002

(54) METHOD AND APPARATUS FOR SUPPORTING WAKE-ON VOICE AND WAKE-ON MIC TECHNOLOGY

(75) Inventor: Brian S. Forbes, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/848,357

(22) Filed: May 4, 2001

(51) Int. Cl.[7] .................................................. G06F 1/26
(52) U.S. Cl. ...................................................... 713/323
(58) Field of Search ............................... 713/320, 321, 713/322, 323, 324; 704/271, 274, 275

(56) References Cited

U.S. PATENT DOCUMENTS 5,689,715 A * 11/1997 Crump et al. ............... 713/310
5,765,001 A * 6/1998 Clark et al. ................. 713/340
5,983,186 A * 11/1999 Miyazawa et al. .......... 704/275
6,012,029 A * 1/2000 Cirino et al. ................ 704/275

* cited by examiner

Primary Examiner—Peter S. Wong
Assistant Examiner—X. Chung-Trans
(74) Attorney, Agent, or Firm—Antonelli, Terry, Stout & Kraus, LLP

(57) ABSTRACT

An audio wake-up circuit for use to wake up a computer system from a sleep mode. Such an audio wake-up circuit comprises an operational amplifier (Op-Amp) coupled to receive an audio input from a user via an audio input device, and having a feedback network arranged to compare the input audio with an attenuated version of the output audio and make an appropriate amplification; and a switching device coupled to the operational amplifier (Op-Amp) and arranged to assert a power management (PME#) wake event so as to wake up the computer system from a sleep mode, when the input audio from the user exceeds a predetermined level.

24 Claims, 6 Drawing Sheets

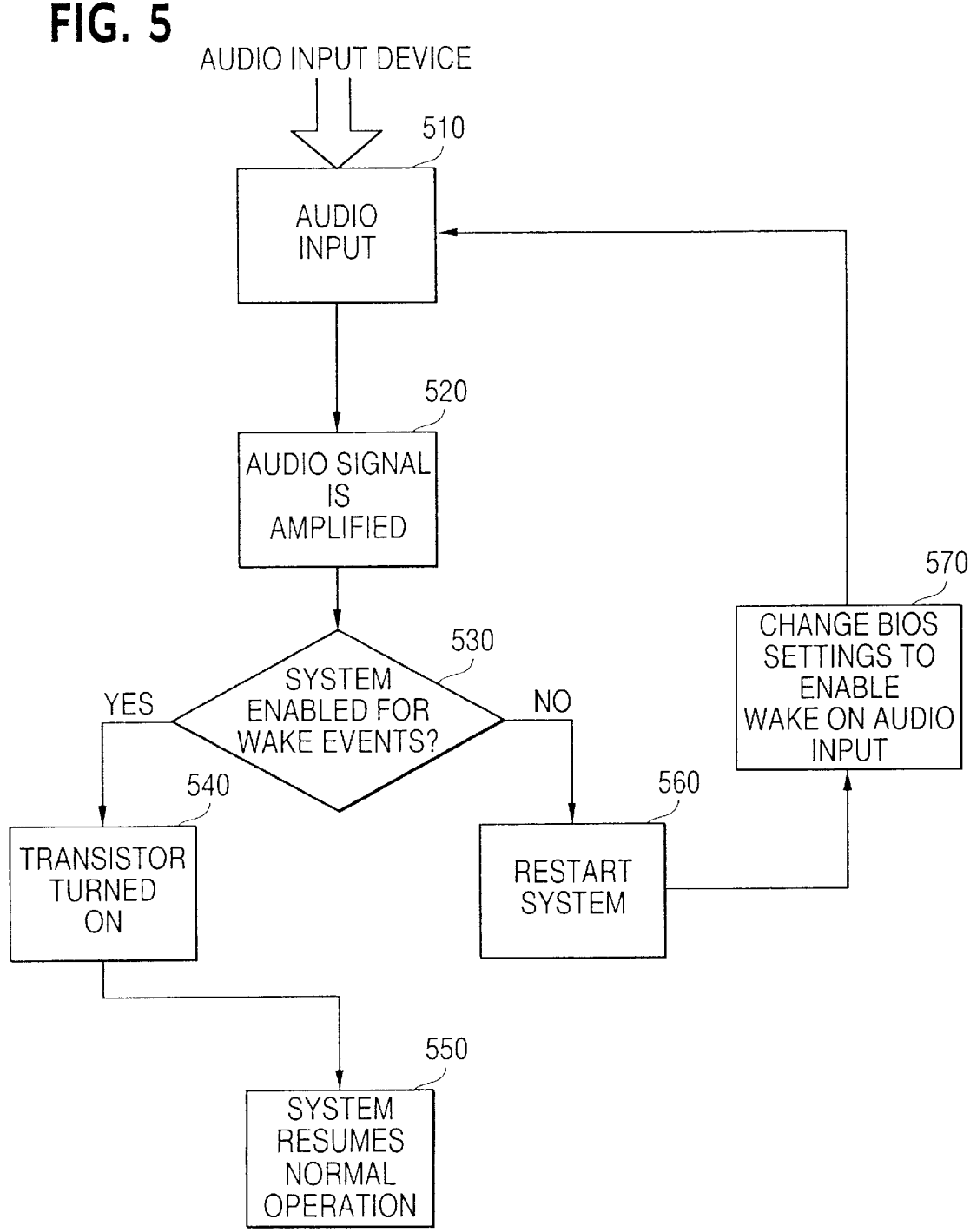

METHOD AND APPARATUS FOR SUPPORTING WAKE-ON VOICE AND WAKE-ON MIC TECHNOLOGY

TECHNICAL FIELD

The present invention relates to an electronics system, and more particularly, relates to a computer system having a mechanism for supporting wake-on voice and wake-on MIC technology.

BACKGROUND

Computer systems typically incorporate some form of power saving and power management techniques to reduce power consumed by the computer systems, particularly portable or notebook computers powered by a battery in order to maximize available battery usage time.

One example such power saving and power management techniques is provided in the Advanced Power Management (APM) specification jointly developed by Intel Corporation and Microsoft Corporation in February 1996. The APM algorithm is implemented by basic input-output system (BIOS) instructions stored in read-only memory (ROM) to provide various power saving functions, and manage the progress of power saving between full-on, standby, and sleep mode. The sleep mode is the level of least power consumption, which interrupts power supplies directed to microprocessor, display apparatus, hard disk drives, floppy disk drives, and other subsystems. The only power supplied is that which can restore the system to the full-on state. Further, the sleep mode may urge the system to enter into full power-off state, if the power management system adopts a suspend-to-disk utility to save the contents of the main memory and the system information to a reserved space on the hard disk.

A later power management specification, the Advanced Configuration and Power Interface (ACPI) specification, version 1.0B, jointly developed by Intel Corp., Microsoft Corp. and Toshiba Corp. in February 1999, is further implemented to enhance power management functionality and robustness, facilitate and accelerate industry-wide implementation of power management, and create a robust interface for configuring motherboard devices. The ACPI specification includes tables, BIOS, and hardware registers. ACPI tables are used to describe system information (e.g., supported power states, power sources, clock sources), features (e.g., available hardware devices), and methods for controlling those features (e.g., ACPI control methods). ACPI BIOS is that part of the computer system firmware that implements the ACPI specified interfaces for sleep, wake-up from sleeping, some restart operations, and provides permanent storage of ACPI table information. ACPI registers are used to store and pass event information between the hardware/firmware and an ACPI driver—an operating system (OS) level program that coordinates all transitions between active and inactive (sleeping) states.

Under the APM specification and the ACPI specification, computer systems may be set to a sleep mode after a period of inactivity to save power and may then be awaken (i.e., resumed normal operation) in response to wake events. However, such computer systems are limited to wake events from manual input devices such as keyboards, pointing devices and mice, and in some special circumstances, remote wake events from remote devices via modems or network interface cards (NICs).

For those users who may be suffering from mobility disadvantages, blindness etc., known wake events from manual input devices or from remote devices via modems or NICs may not be effective and useful. An additional wake event such as a wake-on voice option or wake-on MIC technology is more desirable. However, current computer systems do not support any type of wake-on voice or wake-on MIC technology in which computer systems are awaken from a sleep mode via voice input via a MIC interface.

Accordingly, there is a need for a circuit design that allows a user to conveniently wake the computer system from a sleep mode via voice input via a MIC interface.

BRIEF DESCRIPTION OF THE DRAWINGS

A more complete appreciation of exemplary embodiments of the present invention, and many of the attendant advantages of the present invention, will become readily apparent as the same becomes better understood by reference to the following detailed description when considered in conjunction with the accompanying drawings in which like reference symbols indicate the same or similar components, wherein:

FIG. 5 illustrates a flowchart of an example computer system for resuming normal operation in response to a wake-on voice according to an embodiment of the present invention.

DETAILED DESCRIPTION

The present invention is applicable for use With all types of computer systems, processors and chipsets, including chipsets with PCI 64-bit hubs (P64H) and P64H follow-on products which link together work stations, servers, peripherals and storage devices, and new chipsets having APM-compliant and ACPI-compliant controllers incorporated therein and new computer platforms which may become available as computer technology develops in the future.

Figure 1:
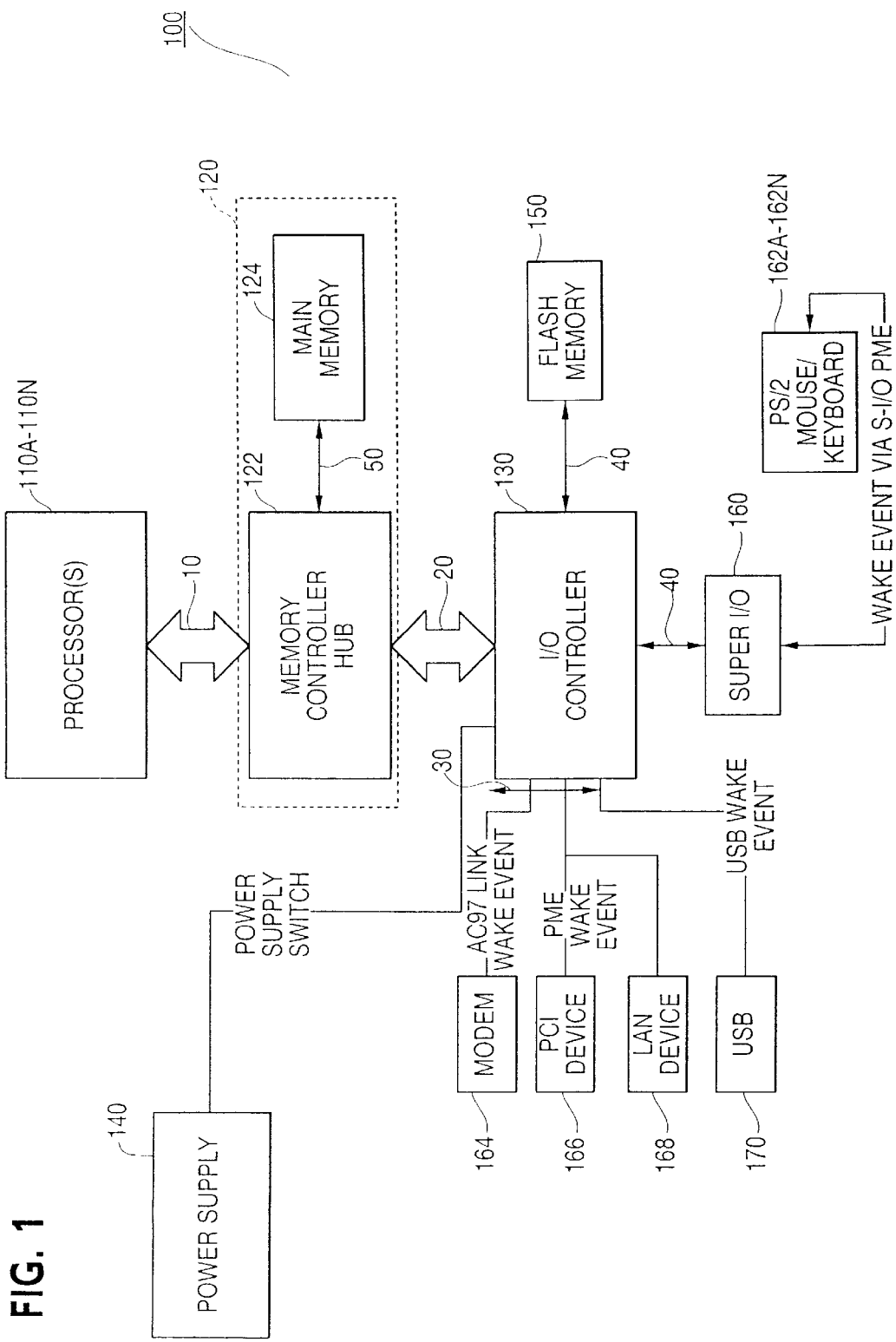
FIG. 1 illustrates an example computer system platform having a typical power management function incorporated therein.

Attention now is directed to the drawings and particularly to FIG. 1, an example computer system platform having an APM and ACPI system incorporated to handle various types of power management events including wake events from manual input devices such as keyboards, pointing devices and mice, and remote wake events from remote devices via modems or network interface cards (NICs) is illustrated. As shown in FIG. 1, the computer system 100 (which can be a system commonly referred to as a personal computer "PC") may comprise a processor subsystem 110, a memory subsystem 120, connected to the processor subsystem 110 by a front side bus 10, one or more host chipsets (e.g., expansion bridges) 130 connected to the memory subsystem 120 by a hub link 20 for providing an interface with peripheral buses such as a non-legacy Peripheral Component Interconnect (PCI) bus 30, a power supply 140 including a power supply switch provided for the user to turn on/off the power supply, a flash memory 150, and a super I/O 160 connected to the chipset 130 by a low pin count (LPC) bus 40 for providing an interface with a plurality of I/O devices.

The processor subsystem 110 may include a plurality of host processors or central processing units (CPUs) 110A–110N such as Intel® i386, i486, Celeron™ or Pentium® processors.

The memory subsystem 120 may include a memory controller hub (MCH) 122 connected to the host processors 110A–110N by a front side bus 10 (i.e., host bus or processor bus) and at least one memory element 124 connected to the MCH 122 by a memory bus 50. The memory element 124 may preferably be a dynamic random-access-memory (DRAM), but may be substituted for read-only-memory (ROM), video random-access-memory (VRAM) and the like. The memory element 124 stores information and instructions such as an operating system (OS) for use by the host processors 110A–110N. The graphics (not shown) may be connected to the 20 main controller hub (MCH) 122 of the memory subsystem 120 by a graphics bus (not shown), and may include, for example, a graphics controller, a local memory and a display device (e.g., cathode ray tube, liquid crystal display, flat panel display, etc.).

The memory controller 120 and the graphics controller (not shown) may be integrated as a single graphics and memory controller hub (GMCH). Such a GMCH may also be implemented as part of a host chipset along with an I/O controller hub (ICH) as described, for example, in Intel® 810, Intel® 870 and 8XX series chipsets.

The host chipset (e.g., expansion bridge) 130 may be a Peripheral Component Interconnect (PCI) chips such as, for example, the PIIX4® chip and PIIX6® chip manufactured by Intel Corporation. In particular, the chipset 130 may correspond to an input/output controller hub (ICH) connected to the MCH 122 of the memory subsystem 120, and may operate as an interface between the front side bus 10 and peripheral buses such as a non-legacy Peripheral Component Interconnect (PCI) bus 30. The PCI bus 30 may be a high performance 32 or 64 bit synchronous bus with automatic configurability and multiplexed address, control and data lines as described in the *"PCI Local Bus Specification, Revision 2.1"* set forth by the PCI Special Interest Group (SIG) on Jun. 1, 1995, or the latest version *"PCI Local Bus Specification, Revision 2.2"* published on Dec. 18, 1998 for add-on arrangements (e.g., expansion cards) with new video, networking, or disk memory storage capabilities. Other types of bus architecture such as an Industry Standard Architecture (ISA) bus and Extended Industry Standard Architecture (EISA) bus may also be utilized.

The flash memory (e.g. EPROM) 150 may be connected to the ICH 150 via a low pin count (LDC) bus 40. Such a flash memory 150 may also store an operating system (OS), a set of system basic input/output start up (BIOS) instructions at startup of the computer system 100 and ACPI instructions implemented to provide various power saving functions, and manage the progress of power saving between full-on, standby, and sleep mode. Alternatively, the operating system (OS), the BIOS instructions and the ACPI instructions may be stored in the memory 124 of the memory subsystem 120.

The super I/O 160 may provide an interface with another group of I/O devices 162A–162N including, for example, a keyboard controller for controlling operations of an alphanumeric keyboard, a cursor control device such as a mouse, track ball, touch pad, joystick, etc., a mass storage device such as magnetic tapes, hard disk drives (HDD), and floppy disk drives (FDD), and serial and parallel ports to printers, scanners, and display devices.

One or more PCI 2.1/2.2 compliant peripheral devices, such as a modem 164 and a local area network (LAN) device 168 such as a network interface card (NIC) may be connected to the PCI bus 30 for enabling access to a public switched telephone network (PSTN) or other networks such as a local area network (LAN) for example. In addition, a PCI device 166 and a universal serial bus (USB) device 170 may be utilized in compliance with the "PCI Local Bus Specification, Revisions 2.1 and 2.2" and the "Universal Serial Bus Specification, Revision 2.0" published on Apr. 27, 2000 for add-on arrangements with new video, networking, disk memory storage capabilities and communication peripherals such as telephone/fax/modem adapters, answering machines, scanners, personal digital assistants (PDAs) etc.

The modem 164 and the LAN device 168 may be configured to respond to certain events initiated remotely, such as an incoming telephone call or a query from a network administrator. Upon detecting a remote event, the modem 164 may generate a link wake event (ring signal) that is used to wake the computer system 100 from a sleep mode. Similarly, the PCI device 166 and the LAN device 168 may generate a power management (PME#) wake event. Likewise, the USB device 170 may generate a USB wake event:to wake the computer system 100 from a sleep mode.

As described with reference to FIG. 1, such a computer system is limited to wake events from a keyboard/mouse 162A–162N, and remote wake events from remote devices via a modem 164, a PCI device 166, a LAN device 168 and a USB device 170. There is no support for any type of wake-on voice or wake-on MIC technology in which such a computer system 100 may be awaken from a sleep mode via voice input via a MIC interface.

Figure 2:
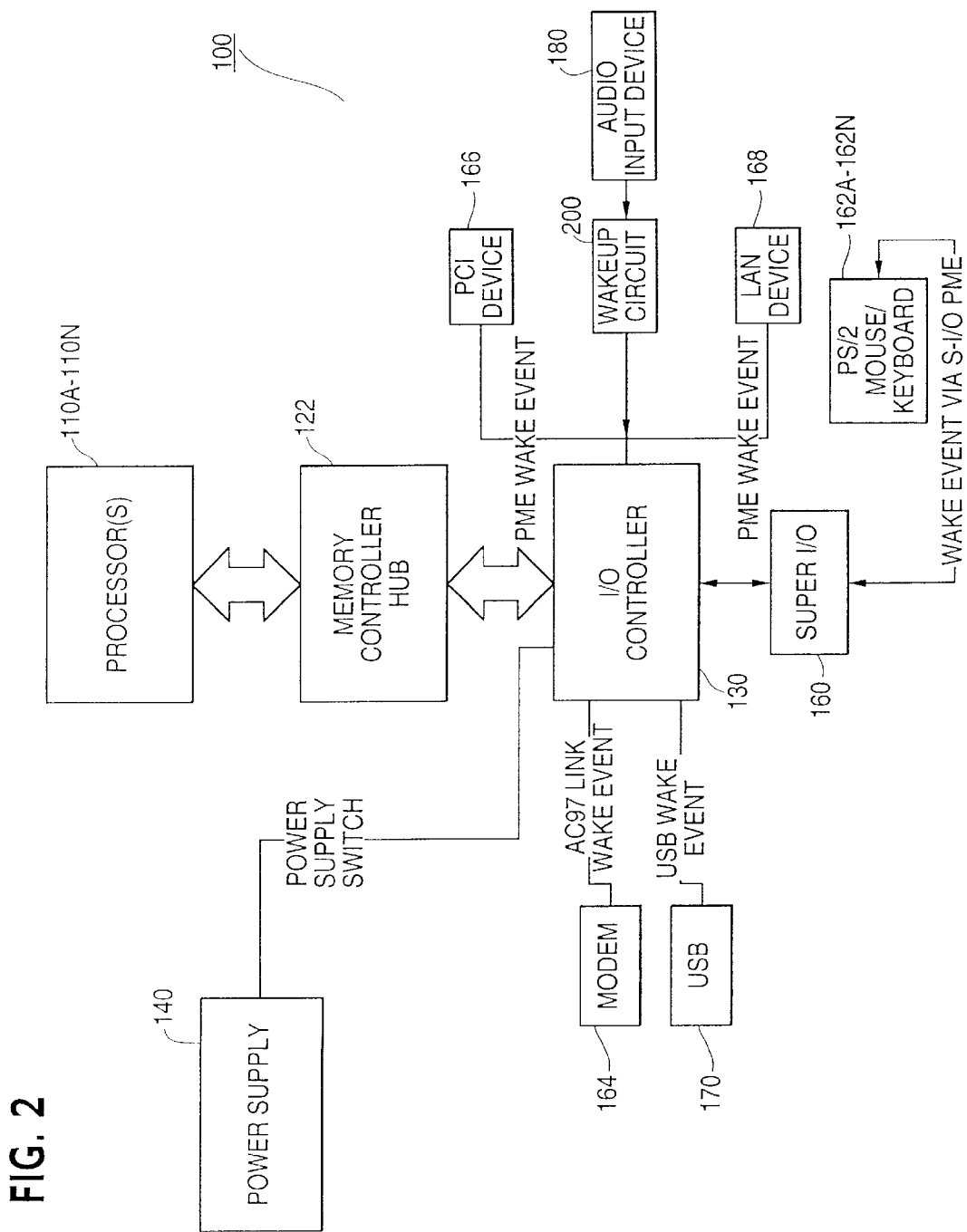
FIG. 2 illustrates an example computer system platform having a voice wake-up circuit incorporated therein for generating a wake event according to an embodiment of the present invention.

Turning now to FIG. 2, an example computer system platform having a voice wake-up circuit incorporated therein for generating a wake event according to an embodiment of the present invention is illustrated. As shown in FIG. 2, an audio input device 180 and a voice wake-up circuit 200 are incorporated therein to respond to the user's voice and generate a wake event within an ACPI aware OS environment so as to wake up the computer system 100 from a sleep mode via an audio input device 180 such as at MIC interface. In addition, the BIOS instructions and the ACPI instructions which may be stored in the flash memory 150 or the main memory 124 of the memory subsystem 120 may further include a "Wake from Voice" feature which allows the user to enable/disable operation of the voice wake-up circuit 200, via the BIOS set-up. Such a voice activated wake event can enhance all PC users experience via simple technology and benefit all PC users, especially those who may be suffering from mobility disadvantages, blindness, etc.

Figure 3A:
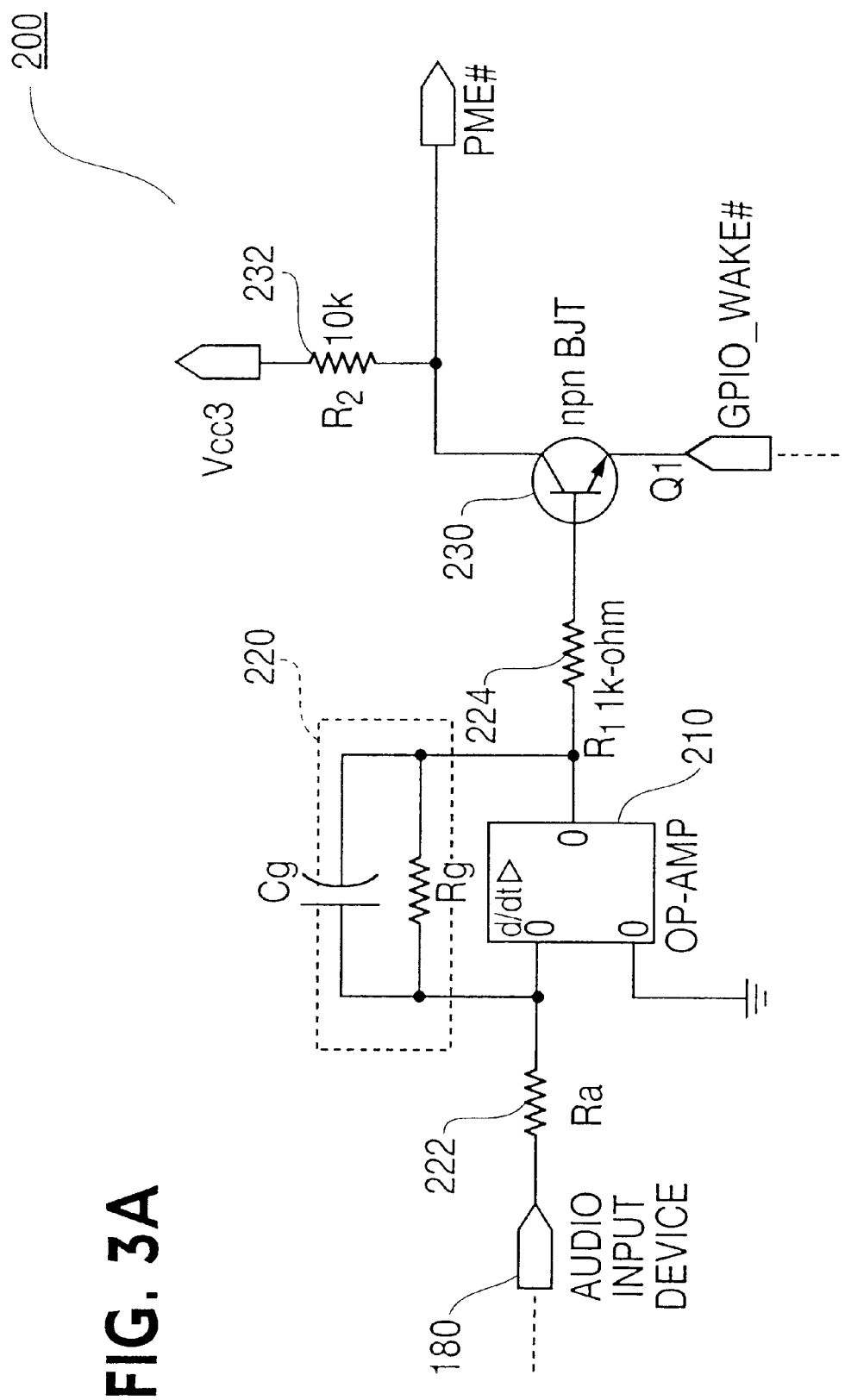
FIGS. 3A–3B illustrate a circuit diagram of: an example voice wake-up circuit according to an embodiment of the present invention.
Figure 3B:
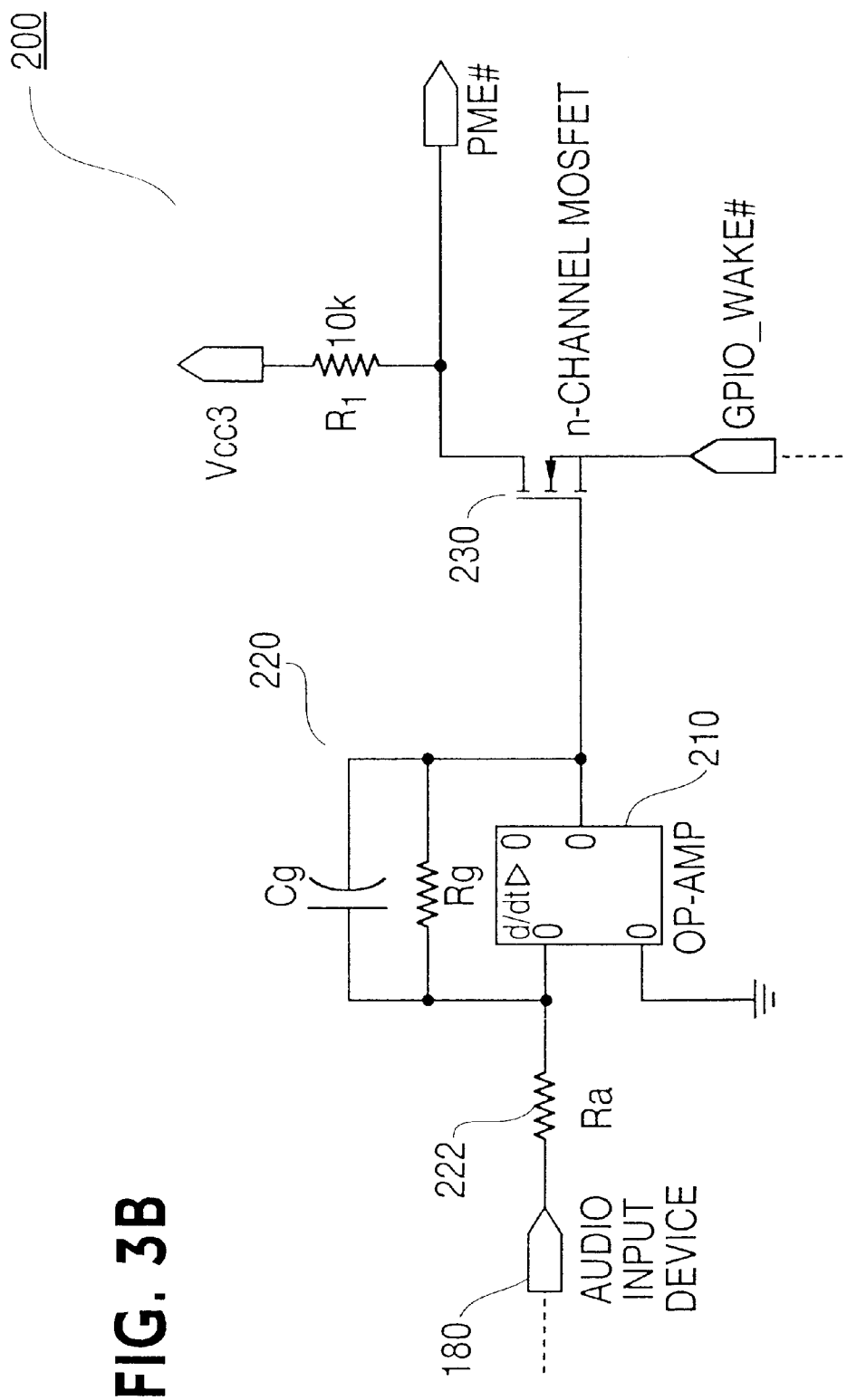

FIGS. 3A–3B illustrate a circuit diagram of an example voice wake-up circuit 200 according to an embodiment of the present invention. The voice wake-up circuit 200 features a differential analog operational amplifier (OP-AMP) 210 with an audio input device 180 in series with an n-channel transistor 230 serving as a switch for asserting or de-asserting a PME# wake event in response to an input audio or voice from the user. A feedback network 220 may be provided to amplify an input audio or voice from the user via an audio input device 180, an input resistor Ra 222 and the OP-AMP 210 so as to activate the switching transistor 230 to assert a PME# wake event. Such a feedback network 220 may correspond to a RC circuit arranged to ensure that the audio or voice from the user will be differentiated from computer noise or ambient noise. The n-channel transistor 230 may be a NPN type bipolar junction transistor (BJT) as shown in FIG. 3A, or alternatively, a n-channel MOSFET ("Metal-Oxide-Semiconductor Field-Effect Transistor") as shown in FIG. 3B. When the PME# wake event is generated from the voice wake-up circuit 200, the I/O controller 130 as shown in FIGS. 1–2 may access the ACPI instructions stored in the flash memory 150 or the main memory 124 of the memory subsystem 120 and wake up the computer system 100 from a sleep mode (i.e., resume normal operation).

More specifically, the voice wake-up circuit 200, as shown in FIG. 3A, comprises an OP-AMP 210 arranged to receive an audio or voice from the user via an audio input device 180 and an input resistor Ra 222, and a feedback network 220 arranged to compare the input audio or voice with an attenuated version of the output of the OP-AMP 210 and make an appropriate amplification accordingly.

For example, if an input voltage (Vi)=100 mV, an input resistor R=47 K-ohm, the resistor Rg=1 K-ohm, and capacitor Cg=10 pF, then the amplification will be 47(Vi). The OP-AMP 210 may contain a standby voltage Vcc of 5 volts and produce a minimum output current ($I_{omin}$) of 6 milliamps (mA).

The voice wake-up circuit 200 also includes a NPN type BJT 230 arranged to turn on and assert a PME# wake event to the I/O controller 130 as shown in FIGS. 1–2 so as to wake up the computer system 100 from a sleep mode, when the input audio or voice from the user exceeds a predetermined level (i.e., 100 mV). A follow resistor (R1) 224 is disposed between the output of the OP-AMP 210 and the base of the NPN type BJT 230. A pull up resistor (R2) 232 is disposed between a standby voltage Vcc terminal and the collector of the NPN type BJT 230. The follow resistor (R1) 224 and the pull-up resistor (R2) 232 are provided to ensure that the NPN type BJT 230 is turned on when the input audio or voice from the user exceeds a predetermined level (i.e., 100 mV). In the example shown in FIG. 3A, the follow resistor (R1) 224 may exhibit a resistance value of 10 K-ohm, and the pull-up resistor (R2) 232 may exhibit a resistance value of 1 K-ohm. However, the resistance values of the follow resistor (R1) 224 and the pull-up resistor (R2) 232 are not limited thereto.

The voice wake-up circuit 200 as shown in FIG. 3A may operate as follows:

Input audio or voice from the audio input device 180 creates a low voltage (~100 mVp-p) sinusoid and is fed into the OP-AMP 210. The rising edge of the sinusoid is then amplified by the feedback network 220 and effectively turns on the NPN type BJT (Q1) 230. When the NPN type BJT (Q1) 230 is turned on, the PME# wake event is asserted, effectively waking the computer system 100 from a sleep mode (i.e., transition from a sleep mode to full operation via wake-on audio input).

In addition, the NPN type BJT (Q1) 230 may also be controlled via a general purpose IO wake (GPIO_WAKE#) signal feeding the source of the NPN type BJT (Q1) 230. The GPIO_WAKE# signal is a BIOS control signal that may be set "high" by the user, via the BIOS instructions stored in the flash memory 150 (i.e., BIOS set-up screen), so as to effectively disable operation of the NPN type BJT (Q1) 230, and thereby eliminating any spontaneous PME# assertions during the course of normal operation. When the computer system 100 is powered down in a sleep mode, the GPIO_WAKE# signal may go "low" if "Wake from Voice" is enabled in the BIOS setup screen, for example. If the user wishes to disable this feature, the GPIO_WAKE# signal may remain "high" until altered by the user.

FIG. 3B illustrates a circuit diagram of an example voice wake-up circuit 200 when the switching transistor is a n-channel MOSFET ("Metal-Oxide-Semiconductor Field-Effect Transistor"). The n-channel MOSFET is an attractive alternative to the NPN type BJT (Q1), and may be preferred due to its relatively high input impedance, high thermal stability, easy paralleling, and absence of "second breakdown". As a result, no follow resistor is required. However, all other components remain the same, and the voice wake-up circuit 200 operates as described with reference to FIG. 3A. Again, if an input voltage (Vi)=100 mV, an input resistor R=47 K-ohm, the resistor Rg=1 K-ohm, and capacitor Cg=10 pF, then the amplification factor will be 47(Vi). The OP-AMP 210 may contain a standby voltage Vcc of 5 volts and produce a minimum output current ($I_{omin}$) of 6 milliamps (mA).

Figure 4:
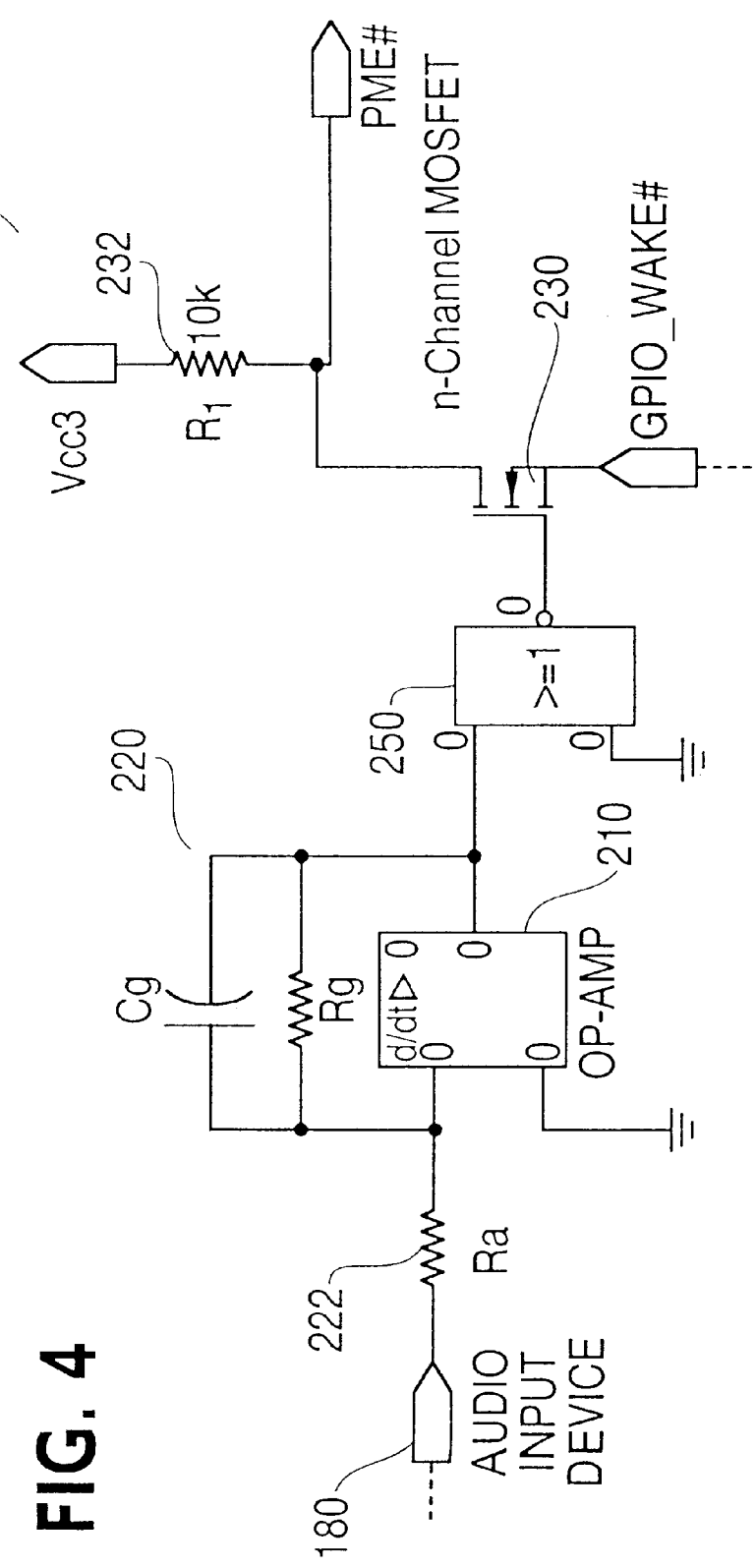
FIG. 4 illustrates a circuit diagram of an example voice wake-up circuit according to another embodiment of the present invention.

FIG. 4 illustrates a circuit diagram of an example voice wake-up circuit according to another embodiment of the present invention. As shown in FIG. 4, the alternative wake-up circuit design comprises the same OP-AMP 210 including a feedback network 220 of a RC circuit arranged to amplify an audio input and latch the gain to the n-channel MOSFET 230 via a comparator 250 in order to assert a PME# wake event to the I/O controller 130 as shown in FIGS. 1–2 so as to wake up the computer system 100 from a sleep mode, when the input audio or voice from the user exceeds a predetermined level (i.e., 100 mV). A pull-up resistor (R2) 232 is also provided to ensure that the n-channel MOSFET 230 activated when the input audio or voice from the user exceeds a predetermined level (i.e., 100 mV). The comparator 250 is utilized to latch an incoming signal to a logic level as defined by the polarity between the ground connection and the output of the OP-AMP 210. Alternatively, an analog-to-digital (AD) converter may be utilized in lieu of the comparator 250 to ensure that the level difference between the inputs thereto is "positive" or "negative". In either situation, if the level difference between the inputs of the comparator 250 is positive, the comparator 250 will latch a logic "1". The n-channel MOSFET 230 will then turn on to: assert a PME# wake event to the I/0 controller 130 so as to wake up the computer system 100 from a sleep mode. However, if the level difference between the inputs is negative, the comparator 250 will latch a logic "0". The n-channel MOSFET 230 will remain inactive.

In addition, the n-channel MOSFET 230 may also be controlled via a general purpose IO wake (GPIO_WAKE#) signal feeding the source (emitter) of the n-channel MOSFET 230 so as to allow the user to conveniently enable/disable the "Wake from Voice" from the BIOS setup screen.

FIG. 5 illustrates a flowchart of an example computer system 100 for resuming normal operation in response to a wake-on voice according to an embodiment of the present invention. As shown in FIG. 5, an audio input is provided from an audio input device 180 at block 510. The audio signal is then amplified to a sufficient level at block 520. The I/O controller 130 of the computer system 100 as shown in FIGS. 1–2 then determines whether the computer system 100 has been enabled for audio wake events (i.e., if the "Wake from Voice" feature has been enabled from the BIOS setup screen) at block 530.

If the computer system 100 has been enabled for audio wake events, the switching transistor 230 of the voice wake-up circuit 200 is turned on and the PME# wake event is asserted to wake the computer system 100 from a sleep mode (i.e., resume normal operation).

However, if the computer system 100 has not been enabled for audio wake events, then the I/O controller 130 determines if the computer system 100 needs to be restarted at block 560, and if necessary, changes the BIOS settings from the BIOS setup screen to enable "Wake from Voice" feature.

As described from the foregoing, the present invention advantageously provides a wake-on voice or MIC technology implemented to allow the user to wake his/her computer system via voice input via a MIC interface. A voice wake-up mechanism may be implemented by a series of OP-AMP, RC circuit and switching transistor, and incorporated within a specifically designed application specific integrated circuit (ASIC) to generate a PME# wake event to the I/O controller so as to wake the computer system as shown in FIGS. 1–2 from a sleep mode. The embodiment of FIGS. 3A–3B and 4 may be preferred but not limited thereto. Steps of the invention as shown in FIG. 5 may be performed by a computer processor executing instructions organized into a program module, or a specially designed state machine. Storage devices suitable for tangibly embodying computer program instructions include all forms of non-volatile memory including, but not limited to: semiconductor memory devices such as EPROM, EEPROM, and flash devices; magnetic disks (fixed, floppy and removable); other magnetic media such as tape; and optical media such as CD-ROM disks. In addition, operating system manipulation of BIOS setup can be initiated by an ACPI control method designed to perform the same task.

While there have been illustrated and described what are considered to be exemplary embodiments of the present invention, it will be: understood by those skilled in the art and as technology develops that various changes and modifications may be made, and equivalents may be substituted for elements thereof without departing from the true scope of the present invention. For example, the computer system as shown in FIGS. 1–2 may be configured differently or employ some or different components than those illustrated. In addition, the wake-on voice mechanism shown in FIGS. 3–5 may be configured differently or employ some or different components than those illustrated without changing the basic function of the invention. For instance, different combinations of logic components such as OP-AMP, transistors and RC circuits may be used to generate a wake event in response to audio or voice. Further, software equivalents to the wake-on voice mechanism as shown in FIGS. 3–5 may be available to generate a wake event. Many modifications may be made to adapt the teachings of the present invention to a particular situation without departing from the scope thereof. Therefore, it is intended that the present invention not be limited to the various exemplary embodiments disclosed, but that the present invention includes all embodiments falling within the scope of the appended claims.

What is claimed is:

1. An audio wake-up circuit for use to wake up a computer system from a sleep mode, comprising:
   an operational amplifier (Op-Amp) coupled to receive an audio input from a user via an audio input device, said operational amplifier (Op-Amp) having a feedback network arranged to amplify the input audio from the user; and
   a switching device coupled to said operational amplifier (Op-Amp) to assert a power management (PME#) wake event so as to wake up the computer system from a sleep mode, when the input audio from the user exceeds a predetermined level.

2. The audio wake-up circuit as claimed in claim 1, wherein said switching device corresponds to a switching transistor having a base coupled to receive an output audio from said operational amplifier, an emitter coupled to a user enable terminal, and a collector coupled to assert said PME# wake event so as to wake up the computer system from a sleep mode, when the input audio from the user exceeds said predetermined level.

3. The audio wake-up circuit as claimed in claim 2, wherein said switching transistor is either a NPN type Bipolar Junction Transistor (BJT) or a n-channel Metal-Oxide-Semiconductor Field-Effect Transistor "MOSFET".

4. The audio wake-up circuit as claimed in claim 2, wherein said user enable terminal is set by the user so as to conveniently enable/disable a "Wake from Voice" feature from a BIOS setup for activating operation of said switching transistor.

5. The audio wake-up circuit as claimed in claim 1, further comprising:
   a comparator arranged to latch an output audio from said operational amplifier (Op-Amp) to a logic level as defined by the polarity between a ground connection and the output audio of said operational amplifier (Op-Amp) so as to enable said switching device to assert said PME# wake event.

6. The audio wake-up circuit as claimed in claim 1, wherein said feedback network of said operational amplifier (Op-Amp) corresponds to a RC circuit having a resistor exhibiting a resistance value set for an appropriate amplification.

7. The audio wake-up circuit as claimed in claim 6, further comprising:
   a first resistor coupled between an output terminal of said audio input device and an input terminal of said operational amplifier (Op-Amp);
   a second resistor coupled between an output terminal of said operational amplifier (Op-Amp) and the base of said switching transistor; and
   a third resistor coupled between a standby voltage terminal Vcc and the collector of said switching transistor.

8. The audio wake-up circuit as claimed in claim 7, further comprising:
   a comparator arranged to latch an output audio from said operational amplifier (Op-Amp) to a logic level as defined by the polarity between a ground connection and the output audio of said operational amplifier (Op-Amp) so as to enable said switching device to assert said PME# wake event.

9. A computer system, comprising:
   a host processor;
   a memory controller coupled to the host processor to control memory operations;
   a chipset coupled to the memory controller to support an audio wake-up circuit for use to wake up the computer system from a sleep mode, said audio wake-up circuit comprising:
      an amplifier device having a feedback network arranged to receive an audio input from a user via an audio input device, compare the input audio with an attenuated version of the output audio and make an appropriate amplification;
      a switching device coupled to said amplifier device to assert a power management (PME#) wake event so as to wake up the computer system from a sleep mode, when the input audio from the user exceeds a predetermined level; and a comparator device to latch the output audio from said amplifier device to a logic level so as to enable said switching device to assert the power management (PME#) wake event.

10. The computer system as claimed in claim 9, wherein said switching device corresponds to a switching transistor having a base coupled to receive the output audio from said operational amplifier, an emitter coupled to a user enable terminal, and a collector coupled to assert said PME# wake event so as to wake up the computer system from a sleep mode, when the input audio from the user exceeds said predetermined level.

11. The computer system as claimed in claim 10, wherein said switching transistor is either a NPN type Bipolar Junction Transistor (BJT) or a n-channel Metal-Oxide-Semiconductor Field-Effect Transistor "MOSFET".

12. The computer system as claimed in claim 10, wherein said audio wake-up circuit further comprises:

a first resistor coupled between an output terminal of said audio input device and an input terminal of said operational amplifier (Op-Amp), a second resistor coupled between an output terminal of said operational amplifier (Op-Amp) and the base of said switching transistor; and a third resistor coupled between a standby voltage terminal Vcc and the collector of said switching transistor.

13. The computer system as claimed in claim 12, wherein said user enable terminal is set by the user so as to conveniently enable/disable a "Wake from Voice" feature from a BIOS setup for activating operation of said switching transistor.

14. The computer system as claimed in claim 12, further comprising:

a flash memory connected to the chipset, to store an operating system (OS), a set of system basic input/output start up (BIOS) instructions at startup, and ACPI instructions implemented to provide various power saving functions, and manage the progress of power saving between full-on, standby, and sleep mode;

a super I/O connected to the chipset, to provide an interface with a group of I/O devices, including a keyboard controller and a cursor control device for providing manual wake events from the user to; and PCI compliant devices connected to the chipset, and arranged to respond to certain events initiated remotely, such as an incoming telephone call or a query from a network administrator so as to generate wake events used to wake the computer system from a sleep mode.

15. The computer system as claimed in claim 14, wherein said switching device is a NPN type Bipolar Junction Switching Transistor.

16. The computer system as claimed in claim 14, wherein said audio wake-up circuit is incorporated within a specifically designed application specific integrated circuit (ASIC).

17. The computer system as claimed in claim 9, wherein said switching device is a n-channel Metal-Oxide-Semiconductor Field-Effect Transistor "MOSFET".

18. The computer system as claimed in claim 9, wherein said feedback network of said amplifier device corresponds to a RC circuit having a resistor exhibiting a resistance value set for said appropriate amplification.

19. A method for supporting wake-on voice in a computer system, comprising:

receiving an audio signal input from a user via an audio input device;

amplifying the audio signal to a sufficient level, via an amplifier device;

determining whether the computer system has been enabled for said wake-on voice;

if the computer system has been enabled for said wake-on voice, latching an amplified audio signal from said amplifier device, via a comparator device, to a logic level necessary for a switch device to assert a power management (PME#) wake event so as to wake the computer system from a sleep mode; and alternatively, if the computer system has not been enabled for said wake-on voice, determining if the computer system needs to be restarted and BIOS settings need to be activated for said wake-on voice.

20. The method as claimed in claim 19, wherein said switching device is either a NPN type Bipolar Junction Transistor (BJT) or a n-channel Metal-Oxide-Semiconductor Field-Effect Transistor "MOSFET" having a base coupled to receive the amplified audio signal and an emitter coupled to a user enable terminal, so as to wake up the computer system from a sleep mode, when the audio signal input from the user exceeds a predetermined level.

21. An audio wake-up circuit for use to wake up a computer system from a sleep mode, comprising:

an amplifier device to amplify an audio input from a user via an audio input device;

a switching device to assert a power management (PME#) wake event so as to wake up the computer system from a sleep mode, when the input audio from the user exceeds a predetermined level; and a comparator device to latch an output audio from the amplifier device to a level as defined by a polarity between a ground connection and the output audio from the amplifier device so as to enable the switching device to assert the power management (PME#) wake event.

22. The audio wake-up circuit as claimed in claim 21, wherein the switching device corresponds to a switching transistor of a NPN type Bipolar Junction Transistor (BJT) or a n-channel Metal-Oxide-Semiconductor Field-Effect Transistor "MOSFET" having a base coupled to receive the output audio from the amplifier device, an emitter coupled to a user enable terminal, and a collector coupled to assert the power management (PME#) wake event so as to wake up the computer system from a sleep mode, when the input audio from the user exceeds the predetermined level.

23. The audio wake-up circuit as claimed in claim 22, wherein the amplifier device is an operational amplifier including a RC circuit having a resistor exhibiting a resistance value set for an appropriate amplification.

24. The audio wake-up circuit as claimed in claim 22, further comprising:

a first resistor coupled between an output terminal of the audio input device and an input terminal of the amplifier device;

a second resistor coupled between an output terminal of the amplifier device and the base of said switching transistor; and a third resistor coupled between a standby voltage terminal Vcc and the collector of said switching transistor.

* * * * *